US006765882B2

(12) United States Patent
Rittle et al.

(10) Patent No.: US 6,765,882 B2
(45) Date of Patent: Jul. 20, 2004

(54) METHOD AND SYSTEM FOR DATA PACKET COLLISION AVOIDANCE IN A WIRELESS COMMUNICATION SYSTEM

(75) Inventors: Loren J. Rittle, Naperville, IL (US);
Timothy J. Spets, Algonquin, IL (US);
Guy G. Romano, Elmhurst, IL (US);
Kenneth T. Crisler, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 609 days.

(21) Appl. No.: 09/896,997

(22) Filed: Jul. 2, 2001

(65) Prior Publication Data

US 2003/0002449 A1 Jan. 2, 2003

(51) Int. Cl.[7] .............................. H04B 7/00; H04Q 7/00; H04L 12/40
(52) U.S. Cl. ........................ 370/277; 370/278; 370/236
(58) Field of Search ............................. 370/230, 230.1, 370/231, 235, 236, 237, 277, 278, 280, 282

(56) References Cited

U.S. PATENT DOCUMENTS

| 3,496,293 A | | 2/1970 | Avery et al. | |
|---|---|---|---|---|
| 4,995,056 A | * | 2/1991 | Fogg, Jr. et al. | 375/220 |
| 5,517,504 A | | 5/1996 | Tran et al. | 370/95.3 |
| 5,673,031 A | * | 9/1997 | Meier | 340/2.4 |
| 6,049,548 A | * | 4/2000 | Bruno et al. | 370/445 |
| 6,111,860 A | | 8/2000 | Braun | |

FOREIGN PATENT DOCUMENTS

| WO | WO 99 11012 A | 3/1999 |
|---|---|---|
| WO | WO 01 05080 A | 1/2001 |

OTHER PUBLICATIONS

Williams, T. et al. "Serial Infrared Link Access Protocol (IrLAP)." Infrared Data Association Link Management Protocol; Jun. 1996.

* cited by examiner

Primary Examiner—Wellington Chin
Assistant Examiner—William Schultz

(57) ABSTRACT

Frame collisions on communication channels connecting half-duplex units and a full-duplex unit are avoided using MAC and LLC layer protocols adapted to arbitrate channel usage. One or more flags can be included in MAC and LLC packet headers and/or acknowledgements to indicate whether subsequent packet transmissions will be attempted by sending units. Units receiving set flags can hold off transmission until receiving cleared flags from the sending units. In this manner, packet collisions can be avoided.

20 Claims, 9 Drawing Sheets

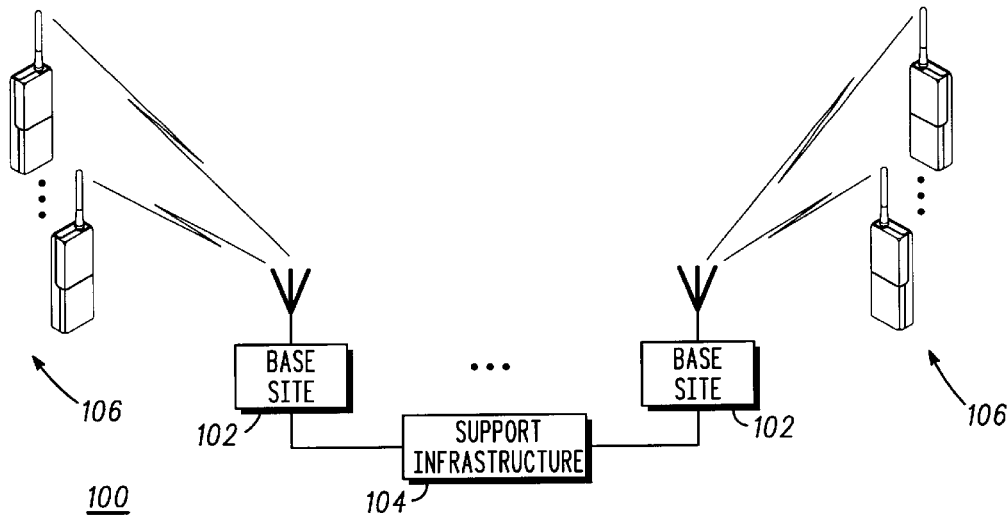
FIG. 1
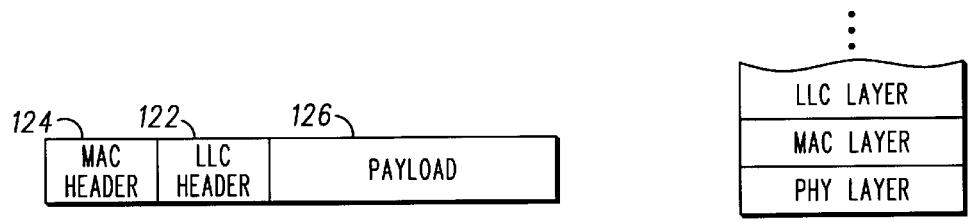
FIG. 3
FIG. 2
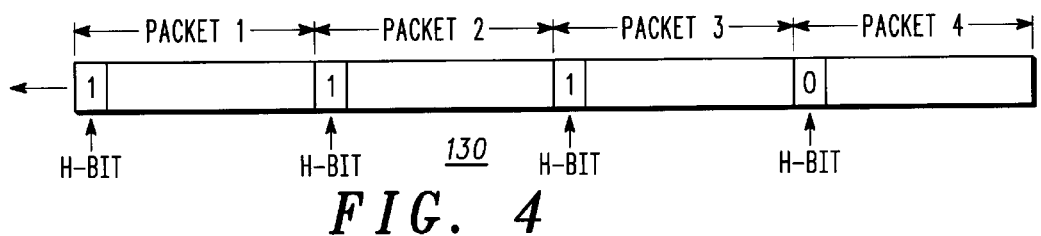
FIG. 4
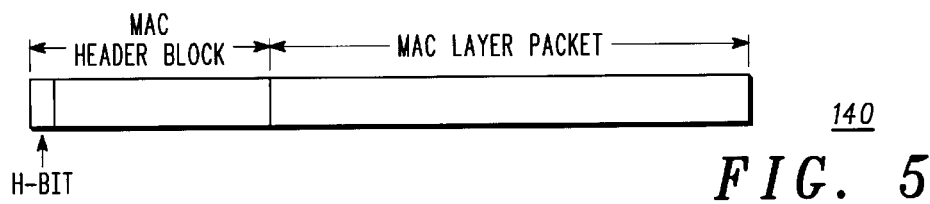
FIG. 5

METHOD AND SYSTEM FOR DATA PACKET COLLISION AVOIDANCE IN A WIRELESS COMMUNICATION SYSTEM

TECHNICAL FIELD OF THE INVENTION

The present invention relates generally to wireless communication systems, and in particular, to a wireless communication system that supports both full-duplex and half-duplex operation.

BACKGROUND OF THE INVENTION

Multi-user, wireless packet data communication systems are known. These systems typically include full-duplex base radio sites operating in conjunction with a support infrastructure for providing interconnect, dispatch and/or Internet protocol (IP) services. The base radio sites are linked to a population of half-duplex and full-duplex mobile subscriber units by way of radio frequency (RF) communication channels.

Each base radio site controls one or more pairs of RF communication channels, where each channel pair supports mobile subscriber units (SUs). One channel of each pair is designated as an uplink channel for carrying information from the mobile subscriber unit to the base site, while the other channel is designated a downlink channel carrying information from the base site to the mobile subscriber unit. Full-duplexed base stations are capable of simultaneously transmitting on the downlink channel and receiving on the uplink channel. However, half-duplex subscriber units can only transmit or receive at any given time. Employing a combination of full-duplex base stations and half-duplex subscriber units in a system can lead to "collisions" on the RF link.

A "collision" occurs when a particular subscriber unit is transmitting a packet of data and a base station is simultaneously transmitting another packet to the same subscriber unit. When a collision occurs, at least one of the two transmitted packets will be lost. Thus, retransmission of the lost packet is sometimes required, reducing overall system throughput.

Accordingly, there is a need for a method and system that prevents the collision of transmitted packets in wireless communication systems that support both full-duplex and half-duplex units.

BRIEF DESCRIPTION OF THE DRAWINGS

FIG. 1 is a block diagram of a wireless communication system in accordance with an embodiment of the present invention.

FIG. 2 is a conceptual diagram illustrating the communication protocol layers of the system shown in FIG. 1.

FIG. 3 illustrates an exemplary data packet used by the system of FIG. 1.

FIG. 4 illustrates a sequence of packets including hold flags in accordance with the present invention.

FIG. 5 is a diagram illustrating the details of one of the packets shown in FIG. 4.

DETAILED DESCRIPTION OF THE PRESENTLY PREFERRED EMBODIMENTS

Figure 6:
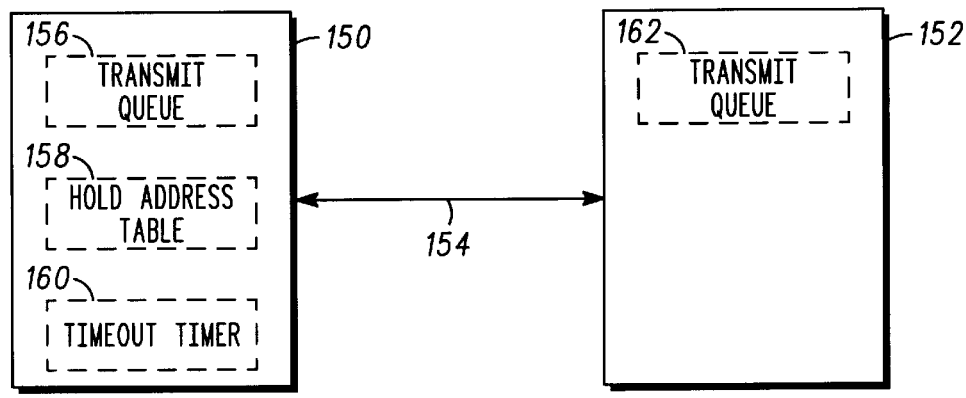
FIG. 6 is a block diagram illustrating details of a full-duplex unit and a half-duplex unit in accordance with another embodiment of the present invention.

It is an advantage of the present invention to provide a method and system that avoids collisions between packets transmitted over wireless channels between full-duplex and half-duplex units.

Turning now to the drawings, and in particular to FIG. 1, there is illustrated a radio frequency (RF) communication system 100 in accordance with an embodiment of the present invention. The system 100 includes a plurality of base sites 102 communicating with a plurality of mobile subscriber units (SUs) 106 over RF channels. A support infrastructure 104 provides various communication services to the base sites 102, such as interconnect, dispatch, and Internet protocol (IP) data packet services. The support infrastructure 104 can include commercially-available components, such as one or more base site controllers, mobile switching centers, home location registers, and dispatch application processors, such as the "iDEN" dispatch application processor commercially-available from Motorola, Inc.

The base sites 102 can support one or more communication modes, such as frequency division multiple access (FDMA), time division multiple access (TDMA) or code division multiple access (CDMA). The base sites 102 can include "iDEN" enhanced base transceiver sites, which are available from Motorola, Inc., configured to perform in accordance with the present invention. The SUs 106 can include any devices for wireless communication with the system 100, including mobile two-way radios, wireless data modems, pagers, cellular telephones, and the like.

Generally, the base sites 102 are capable of full-duplex communication over the wireless channels. In contrast, the SUs 106 are, in general, capable of only half-duplex operation. To prevent packet collisions on the wireless channels, the system 100 can employ link layer control (LLC) and/or media access control (MAC) layer protocols that avoid transmission conflicts on the channels connecting the base sites 102 and SUs 106. In this situation, a packet collision occurs when a particular half-duplex SU, out of the entire population of SUs 106, transmits a packet to a base site 102 concurrently when a base site transmits a packet to that same SU on the paired channel.

FIG. 2 is a conceptual diagram illustrating communication protocol layers usable within the system 100. The layers are identified in accordance with the Open System Interconnection (OSI) nomenclature, and only the lower two layers are illustrated. In accordance with the OSI nomenclature, the lowest protocol layer is a physical (PHY) protocol, such as T1 channel framing. The second protocol layer, the Data Link layer, may be further subdivided into the MAC and LLC layers. The MAC layer, typically adds packet headers and trailers containing error correction or detection information, allowing the system 100 to correct or detect errors incurred during transmission of packets to and from the base sites 102. Other higher-level protocol layers may be implemented by the system 100.

In the preferred embodiment, LAP-D as modified to support a block-wise selective reject operation is the LLC layer. In this context, a block is a portion of an entire frame to be transmitted as a MAC layer packet. Block-wise selective reject is a well-known protocol extension which helps mitigate performance problems due to errors commonly seen in a wireless packet data system. In alternate embodiments, any link or network protocol that uses a positive acknowledgement scheme might serve as the basis for the improvements provided by the present invention.

FIG. 3 illustrates an exemplary packet format usable by the system 100 at the MAC and LLC layers. The packet 120 includes a payload 126 containing voice, data or any other information transported by the system 100. A MAC header 124 and a LLC header 122 are pre-pended to the payload 126. The MAC header 124 contains control information, such as flags, addresses, error codes, or the like that are used by the MAC layer protocol. The LLC header 122 contains appropriate control information used by the LLC protocol. Before payload information is passed between the base sites 102 and the SUs 106 over the channel, it is encapsulated and de-encapsulated with LLC and MAC header information by the respective protocol layers operating in the base sites 102 and SUs 106.

FIG. 4 illustrates an exemplary sequence of packets 130 in accordance with an embodiment of the present invention. Packets are generally transferred between the SUs 106 and the base sites 102 as streams containing one or more data packets. As shown in FIG. 4, each data packet includes a hold flag, represented by a single bit referred to as the H-bit. When a unit (either a base site or SU) transmits a stream of packets, it sets the hold flag to indicate whether the packet is the last packet of the stream. If a particular packet is not the last packet, the transmitting unit sets the hold flag to one. This indicates to the receiving unit that additional packets will immediately follow the packet with the flag set. The transmitting unit clears the hold flag in the last data packet of the stream by setting it to zero. By monitoring the setting of the hold flag, a unit receiving the stream of packets can avoid collision by deferring transmission of downlink packets until after it receives an uplink data packet having the hold flag cleared.

FIG. 5 illustrates an exemplary MAC layer packet 140 that includes the hold flag (H-bit) in the MAC header. In this embodiment of the invention, the MAC layer protocol of the base sites 102 and SUs 106 is responsible for avoiding collision on communication channels linking half-duplex and full-duplex units.

FIG. 6 is a block diagram illustrating exemplary components of a full-duplex unit 150 and a half-duplex unit 152 for utilizing the MAC layer hold flag to avoid packet collisions over an RF channel 154. The components 156–162 are resources available to a MAC layer protocol. In the full-duplex unit 150, a transmit queue 156 is provided for temporarily storing downlink packets due to be transmitted to the half-duplex unit 152 over the channel 154. A hold address table 158 stores identifiers corresponding to half-duplex units. Unit identifiers are placed in the table 158 in response to receiving a packet having a set H-bit. A timeout timer 160 sets timeout periods for receiving packets and acknowledgements from the half-duplex unit 152.

The half-duplex unit 152 includes a transmit queue 162 for temporarily storing uplink packets that are to be transmitted to the full-duplex unit 150.

The full-duplex unit 150 can be one of the base sites 102, and the half-duplex unit 152 can be one of the SUs 106.

Figure 7:
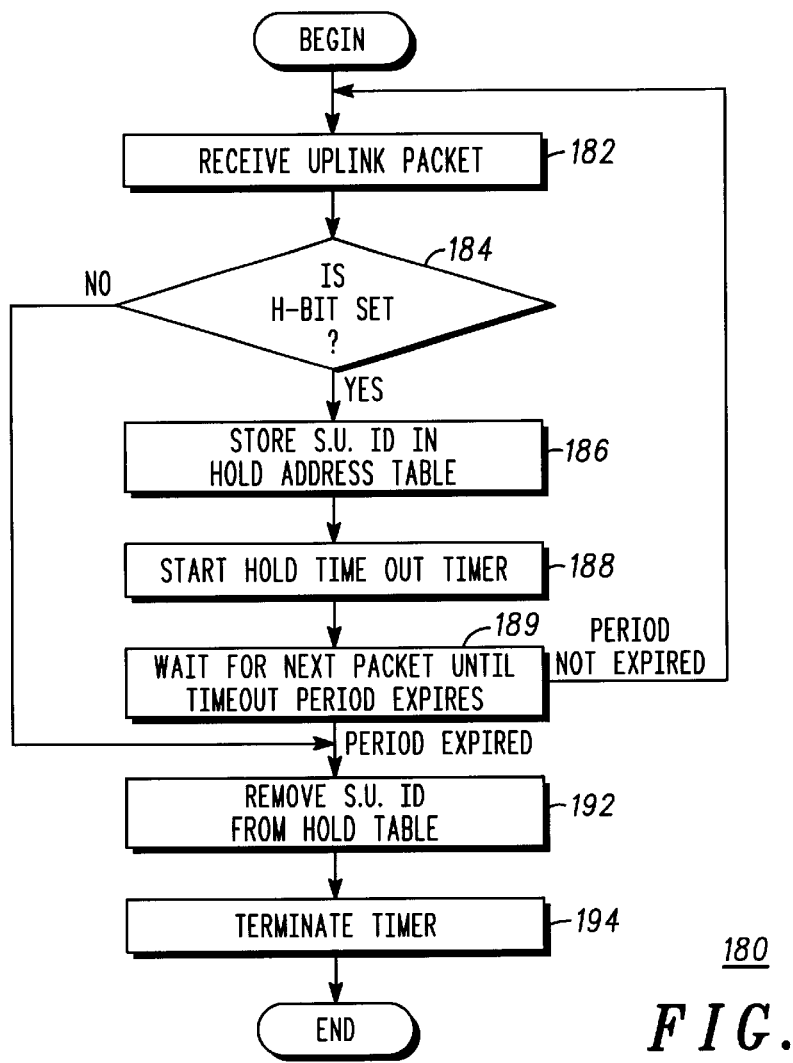
FIG. 7 is a flow chart illustrating a receive operation of the full-duplex unit shown in FIG. 6.

FIG. 7 is a flow chart 180 of a receive operation of the full-duplex unit 152. In step 182, an uplink packet is received from the half-duplex unit 152. In step 184, a check is made to determine whether the hold flag (H-bit) is set. If the hold flag is set, this indicates that one or more subsequent packets will immediately follow the received uplink packet. In this case, the full-duplex unit 150 stores the SU identification value (SU ID) embedded in the uplink packet in the hold address table 158 (step 186). In step 188, the hold timeout timer 160 is started. The full-duplex unit 150 then waits for the next packet (step 189). If the timeout period expires without receiving the next packet, the SU ID is removed from the hold address table 158. If the next uplink packet is received prior to the expiration of the timeout period, the procedure returns to step 182.

If the H-bit of the uplink packet is cleared, the SU ID is removed from the hold address table 158 (step 192). The timeout timer associated with the SU ID is terminated (step 194).

Figure 8:
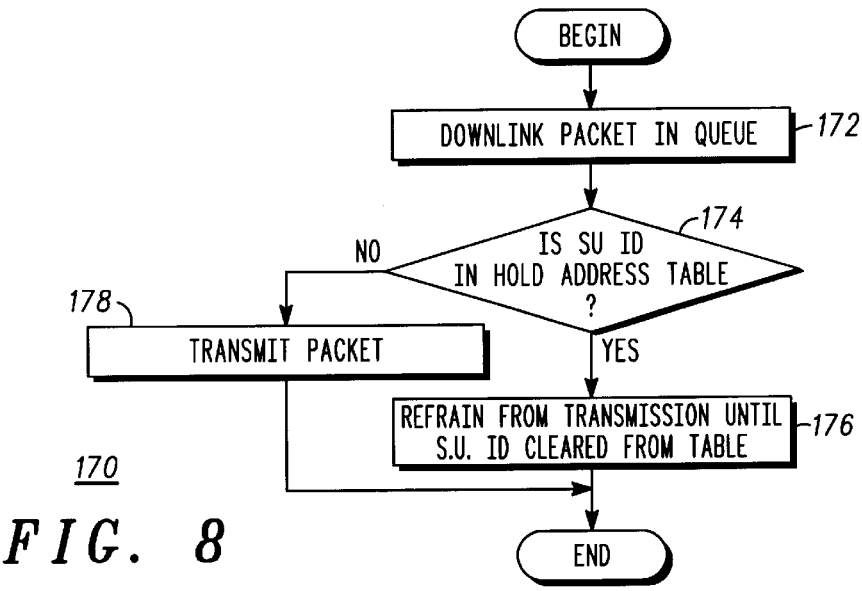
FIG. 8 is a flow chart illustrating a transmit operation of the full-duplex unit shown in FIG. 6.

FIG. 8 is a flow chart 170 illustrating the transmit operation of the full-duplex unit 152. In step 172, a downlink packet due to be transmitted to the half-duplex unit 152 is stored in the transmission queue 156. The downlink packet includes an SU identification value (SU ID). In step 174, a comparison is made between the packet SU ID and the SU IDs stored in the hold address table 158. If the SU ID is found in the hold address table 158, the full-duplex unit 150 holds off transmission of the downlink packet in the transmission queue 156 until the SU ID is cleared from the table 158 (step 176). If, on the other hand, the SU ID is not present in the table 158, the full-duplex unit 150 transmits the downlink packet to the half-duplex unit 152 over the channel 154 (step 178).

The hold address table 158 can store multiple SU IDs. In addition, a timeout timer can be instantiated for each SU ID appearing in the table 158. The procedures illustrated in FIGS. 7–8 can be executed as multi-tasked procedures on a per SU ID basis.

Figure 9:
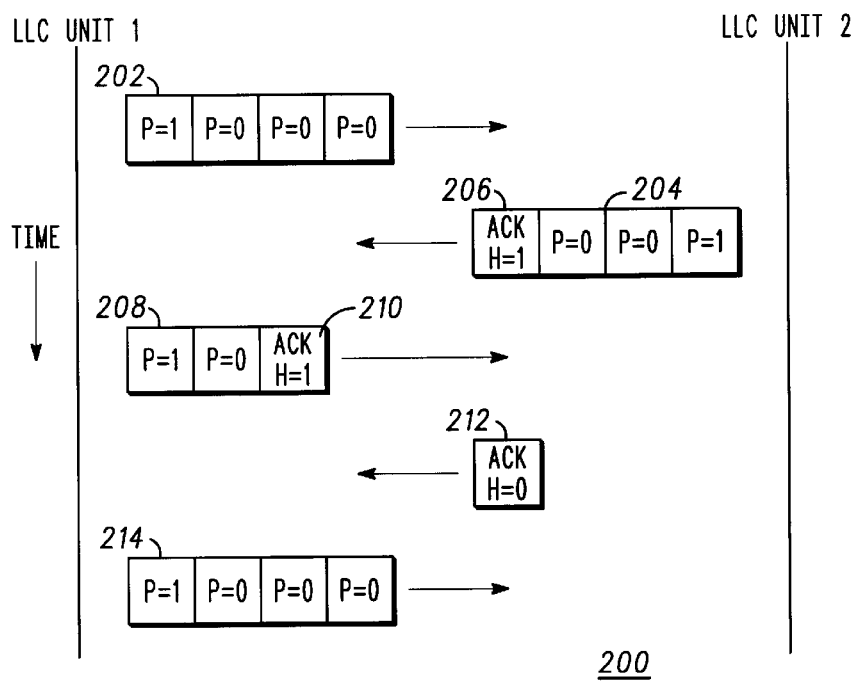
FIG. 9 is a Message Sequence Chart illustrating an LLC protocol in accordance with a further embodiment of the present invention.

FIG. 9 is a Message Sequence Chart illustrating an LLC protocol in accordance with an alternate embodiment of the present invention. In this LLC protocol, link layer acknowledgments (ACKs) include a flag that indicates to the receiving unit that one or more subsequent packets will be generated by the acknowledging unit. The receiving unit will then hold off new traffic to the sending unit until that unit has finished its transmission and has requested an ACK from the receiving unit.

The Message Sequence Chart 200 illustrates an exemplary succession of data streams transmitting between a first unit (unit 1) and a second unit (unit 2). In the exemplary scenario shown, unit 1 transmits a first data stream 202 comprising one or more packets or information frames. Each frame includes a flag, referred to as a P-bit, indicating whether the frame is the last frame of the stream. If the P-bit is set to zero, the frame is not the last in the stream. However, if the P-bit is set to one, it represents the last frame.

When a half-duplex unit LLC transmits a stream of frames, it can set the P-bit of the last frame in the stream. This indicates to the receiving peer LLC layer that the sender is now ready to receive an acknowledgment. Frames which contain a cleared P-bit indicate that the sender is not currently requesting an acknowledgment.

With only a P-bit flag, an opportunity for frame collision occurs after the receiving peer LLC layer sends an acknowledgment. At this particular time, either peer LLC layer can send frames.

To reduce or eliminate the possibility of collisions following transmission of an acknowledgement, a hold flag is included in the acknowledgment. This is illustrated in the second data stream 204 transmitted by unit 2.

The second stream 204 begins with an ACK 206 having a hold flag set to one. The set flag indicates to the LLC layer of unit 1 to hold off sending further frames because additional frame traffic is following the ACK 206. Unit 1 can then hold off transmitting further frames to unit 2 until it receives a frame with P=1, an ACK with the hold flag cleared, or the expiration of an internal timeout timer.

In the example shown, after unit 1 receives the last frame of the second stream 204 with P=1, it sends a third stream 208. The third stream 208 begins with an ACK 210 having the hold flag set to one, indicating that additional frames are to be transmitted by unit 1 following the ACK 210. Upon receiving the ACK 210, unit 2 determines that the hold flag is set and waits for the additional traffic before sending any further frames to unit 1. Upon receiving the last frame of the stream 208 (with P=1), unit 2 transmits an ACK 212 with the hold flag cleared (H=0). This indicates to unit 1 that the LLC layer in unit 1 is free to transmit more frames or an acknowledgment to unit 2 without waiting.

Unit 1 then transmits a fourth stream of frames 214 to unit 2, setting the P-bit of the last frame.

Figure 10:
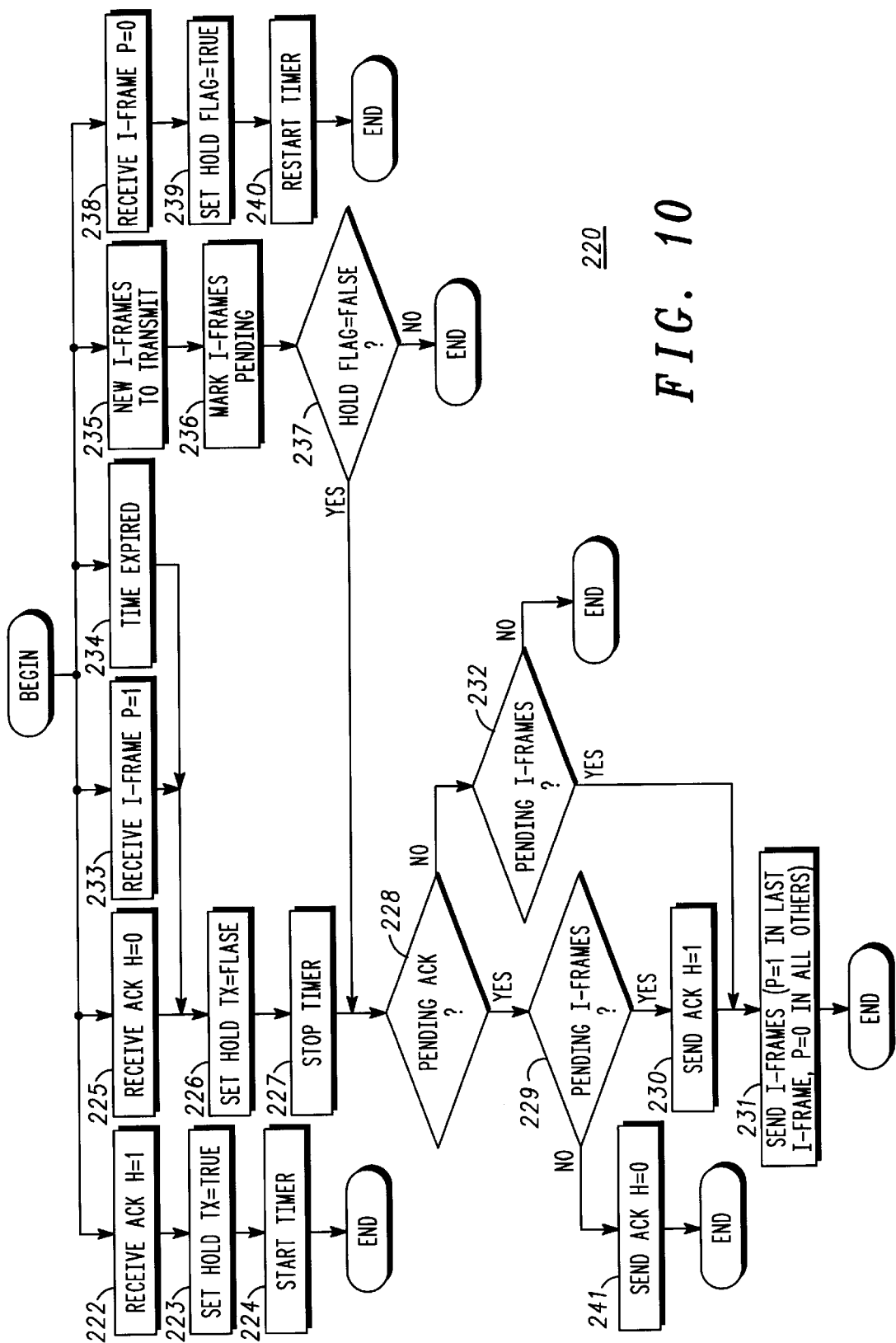
FIG. 10 is a flow chart illustrating receive and transmit operation performed by a unit that implements the LLC protocol of FIG. 9.

FIG. 10 is a flow chart 220 illustrating receiver operation of the LLC layer protocol illustrated in FIG. 9. When an LLC layer on a half-duplex SU receives an acknowledgment with the hold flag set (step 222), it determines that more frames are to immediately follow the acknowledgement and sets the hold transmission flag (HOLD_TX) to true (step 223). After receiving the ACK with the hold flag set, the LLC layer starts a time-out timer (step 224). The timer will be modified normally with the reception of another subsequent frame from the acknowledging unit. Accordingly, if a subsequent frame is received prior to the timeout expiration, a check is made to determine whether the P-bit of the frame is set (step 233). If the P-bit is set, indicating the last frame in a stream, the HOLD_TX flag is set to false (step 226) and the timer is stopped (step 227). The LLC layer then checks for any queued ACKs for transmission to the sending unit (step 228). Then a check is made to determine if there are any pending I-frames (steps 229, 232).

If there is a pending ACK and I-frame, an ACK with H=1 is transmitted (step 230), followed by transmission of the pending I-frame(s) (step 231), with the last I-frame having P=1. If there is no pending ACK, but a pending I-frame (step 232), then the pending I-frame(s) are transmitted, with the last I-frame having P=1 (step 231). If there is a pending ACK with no pending I-frame(s), then the ACK is sent with H=0 (step 241).

If an ACK with H=0 is received (step 225) or the timer expires (step 234), steps 226–231, 241 are performed, as described above.

If new I-frame(s) are ready to be transmitted (step 235), the frames are marked as pending (step 236), and a check is performed to determine whether the hold flag is set (step 237). If not, steps 228–231, 241 are performed.

If an I-frame is received with the P-bit set to zero (step 238), the hold flag is set to true (step 239). The timeout timer is then restarted (step 240).

Figure 11:
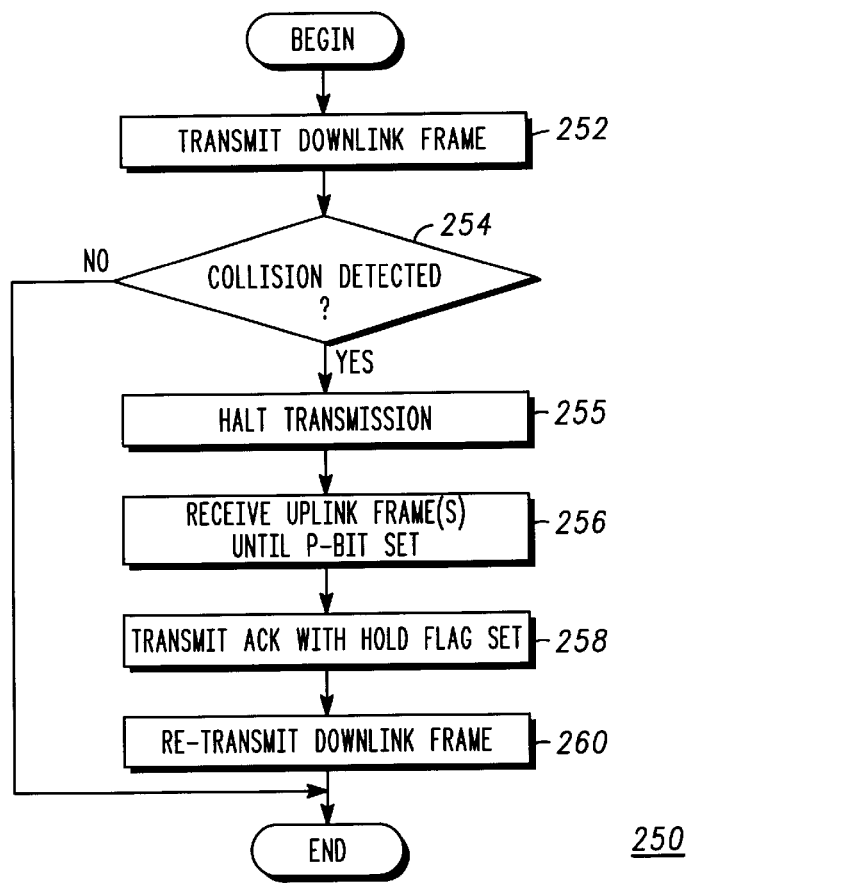
FIG. 11 is a flow chart illustrating an alternate transmit operation performed by a full-duplex unit that implements the LLC protocol illustrated in FIG. 9.

FIG. 11 shows a flow chart 250 of an alternate transmit operation performed by the LLC layer protocol shown in FIG. 9. This alternate transmit operation will be performed after step 231 in FIG. 10. The transmit operation illustrates collision recovery performed by a full-duplex unit in the event of a start-up collision. In step 252, a downlink frame is transmitted by the LLC layer. At a full-duplex unit, a check is made to determine whether the transmission of the downlink frame resulted in a collision on the communication channel (step 254). At a full-duplex unit, a collision is detected when frames are received during the same time period when downlink frames are being transmitted. If a collision is detected, the transmission (if not completed) of the downlink frame is halted (step 255). The unit continues to receive the uplink frames until receiving a frame having the P-bit set (step 256). After receiving the last frame, the full-duplex unit transmits an acknowledgement with the hold flag set to indicate a subsequent transmission of further frames (step 258). Following the ACK, the downlink frames are retransmitted to the half-duplex unit (step 260).

Figure 12:
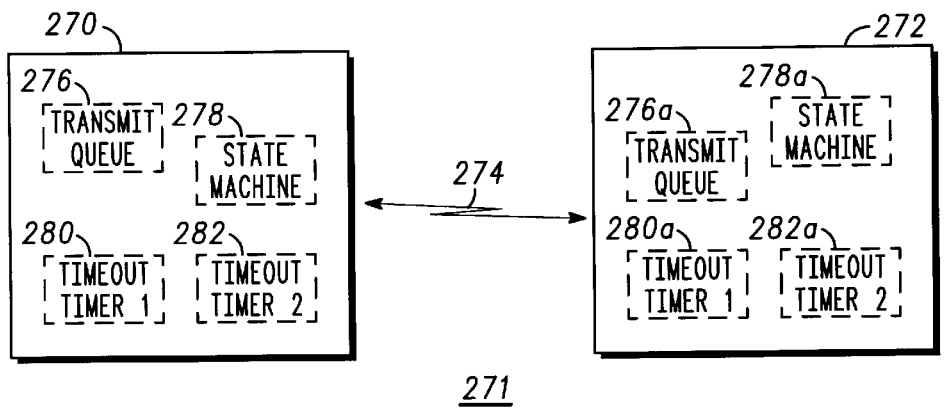
FIG. 12 is a block diagram illustrating details of a full-duplex unit and a half-duplex unit in accordance with another embodiment of the present invention.

FIG. 12 is a block diagram illustrating a system 271 in accordance with the preferred embodiment of the present invention. This preferred embodiment along with alternatives is described as follows. In the system 271, an LLC layer protocol is employed to prevent packet collision between a full-duplex unit 270 and a half-duplex 272. The full-duplex unit 270 and half-duplex unit 272 communicate over a channel 274, which can be a wireless link. Although only one half-duplex unit is shown in FIG. 12, multiple half-duplex units can operate with the full-duplex unit 270.

The full-duplex unit 270 includes a transmit queue 276, a state machine 278, and one or more time-out timers 280, 282.

The half-duplex unit 272 includes a transmit queue 273, a state machine 278a, and one or more time-out timers 280a, 282a.

The full-duplex unit 270 can be any component in a radio communication system capable of full-duplex operation, and is preferably a base site. The half-duplex unit 272 can be a component of a radio communication system capable of only half-duplex operation, such as a mobile subscriber unit.

In the preferred embodiment, the LLC protocol itself conveys all information on the duplex status of the unit. In one embodiment, all SUs in the system 271 are known to be capable of half-duplex operation only. In an alternative embodiment, a parameter is negotiated during registration of the half-duplex unit 272, such that the LLC protocol of the full-duplex unit 270 can be made aware that the half-duplex unit 272 is capable of only half-duplex operation. This allows the LLC protocol to inhibit sending packets to the half-duplex unit 272 during certain scenarios. This reduces the likelihood that the half-duplex unit 272 will miss packets or frames transmitted from the full-duplex unit 270, causing retransmission of the lost packets.

In the preferred embodiment, the state machines 278 and 278a use a set of rules to decide when a unit can transmit a packet and when it is held from making transmissions. To accomplish this, the LLC layer state machine relies on a hold bit included in packets transmitted between the two units 270, 272. Generally, a hold bit that is set notifies the receiving unit that the other unit has additional packets in its transmit queue waiting to be transmitted. Upon receiving a set hold bit, the unit waits until a cleared hold bit is received before attempting packet transmission to the other unit. In an alternative embodiment, 278a, 280a and 282a do not exist, and all transmission decisions are made in the state machine 278 of unit 270.

The full-duplex unit 270 can also be configured to track when it is waiting for an acknowledgment from the half-duplex unit 272. If the full-duplex unit 270 is expecting an ACK and instead receives a packet, it will assume that its previously-transmitted packet was lost and will retransmit the original packet.

In the preferred embodiment, timers 280, 280a, 282 and 282a all mirror standard LAP-D timers used to recover from channel errors. Alternatively, different timers could be used.

Figure 13:
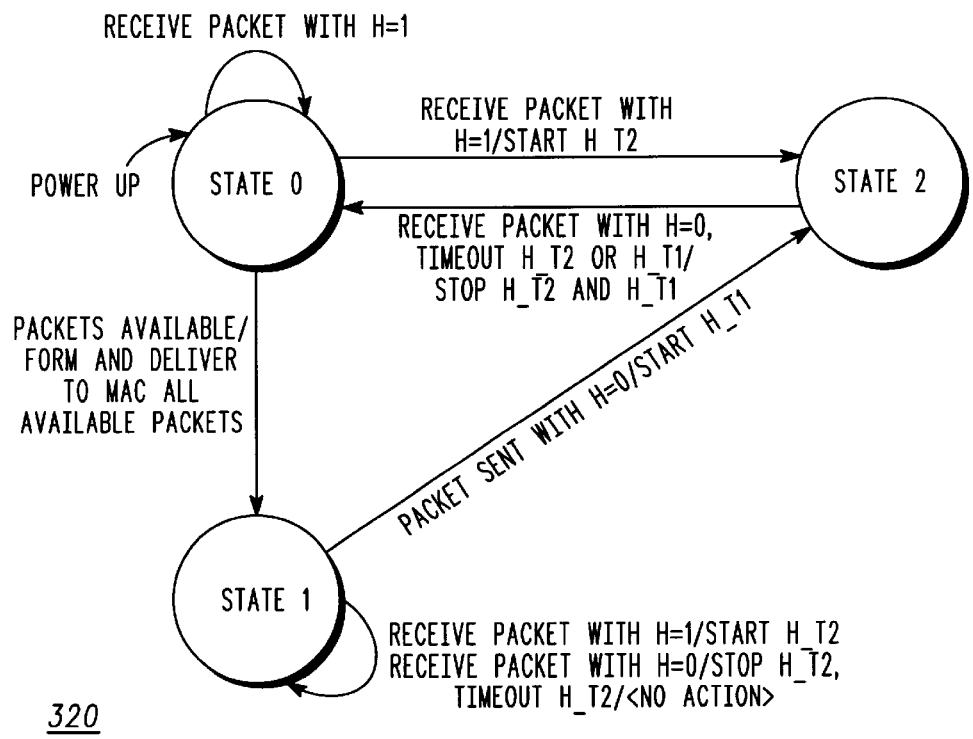
FIG. 13 is a state transition diagram illustrating a second state machine includable in the full-duplex unit shown in FIG. 12.

FIG. 13 is a state transition diagram illustrating the preferred embodiment of a state machine 320 includable in both the half-duplex unit 272 and the full-duplex unit 270 shown in FIG. 12. The state machine 320 implements a procedure in the LLC protocol layer which supports collision-free communication with the peer LLC protocol layer. The state machine 320 includes three states: state 0, state 1, and state 2. The transitions between states are illustrated in a standard Event/Action format.

The state machine 320 relies on a hold flag (H-bit) included in packets transmitted between the full-duplex and half-duplex units 270, 272. The H-bit is set in a packet to indicate that additional packets are immediately following. The last packet in a stream has the H-bit cleared to indicate to the receiving unit that no further packets should be expected in the incoming stream.

The state machine 320 is instantiated on the full-duplex unit 270 on a per address basis, meaning that for each half-duplex unit communicating with the full-duplex unit 270, a separate, independent state machine, as well as corresponding transmit queues and timeout timers are provided. In the preferred embodiment, the state machine 320 is also instantiated once on each SU 272. In an alternative embodiment, SU 272 contains no instantiated state machine to handle received H-bits. If the full-duplex unit is capable of detecting or computing collisions, then the state machine 320 can be extended to consider the collision status to determine when to retransmit I-Frames that were potentially lost during the collision period.

Upon power up, the state machine 320 enters state 0. In state 0, the unit assumes that it may transmit packets over the channel to the other unit.

In the preferred embodiment, this procedure only controls when an LLC layer may or may not deliver packets to the local MAC layer for transmission. In an alternate embodiment, the state machine 320 may also control the ordering of LLC layer packets to the peer. For example, the state machine 320 can reorder pending acknowledgements before pending I-Frames in the transmission queue 276, 276a.

Figure 14:
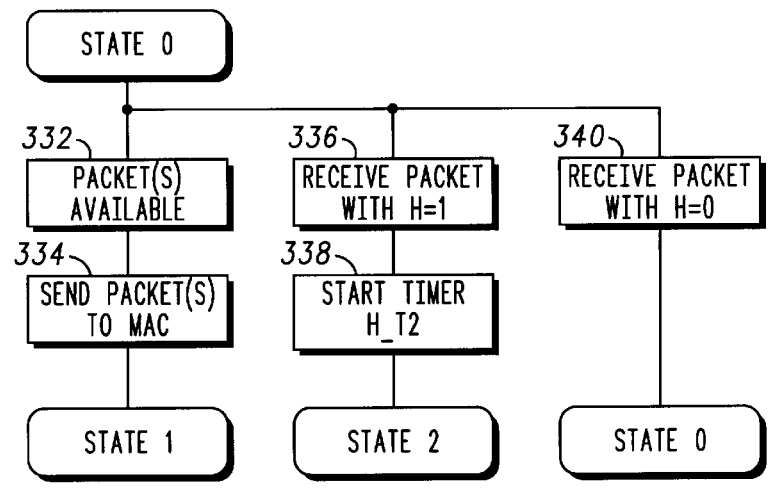
FIG. 14 is a system design chart showing system operation details while the state machine of FIG. 13 is in state zero.

FIG. 14 shows a system design chart 330 showing system operation of the full-duplex unit 270 while in state 0. If packets are available for transmission to the half-duplex unit 272, the packets are formed and delivered to the MAC layer protocol for transmission to the half-duplex unit 272 (step 332–334). The state machine 320 then transitions to state 1.

While in state 0, if a packet is received from the half-duplex unit 272 with the H-bit set to one (step 336), the full-duplex unit 270 starts timeout timer T2 282 for a predetermined timeout period H_T2 (step 338). The period H_T2 defines the maximum amount of time that the full-duplex unit 270 should wait to receive further packets from the half-duplex unit 272 before declaring a timeout. After starting the timeout timer T2, a state machine transitions from state 0 to state 2.

While in state 0, if an uplink packet is received from the half-duplex unit 272 with the H-bit=0 (step 340), the state machine 320 remains in state 0.

In the preferred embodiment, details of the operation of the half-duplex unit 272 in state 0 are similar to that of the full-duplex unit 270.

Figure 15:
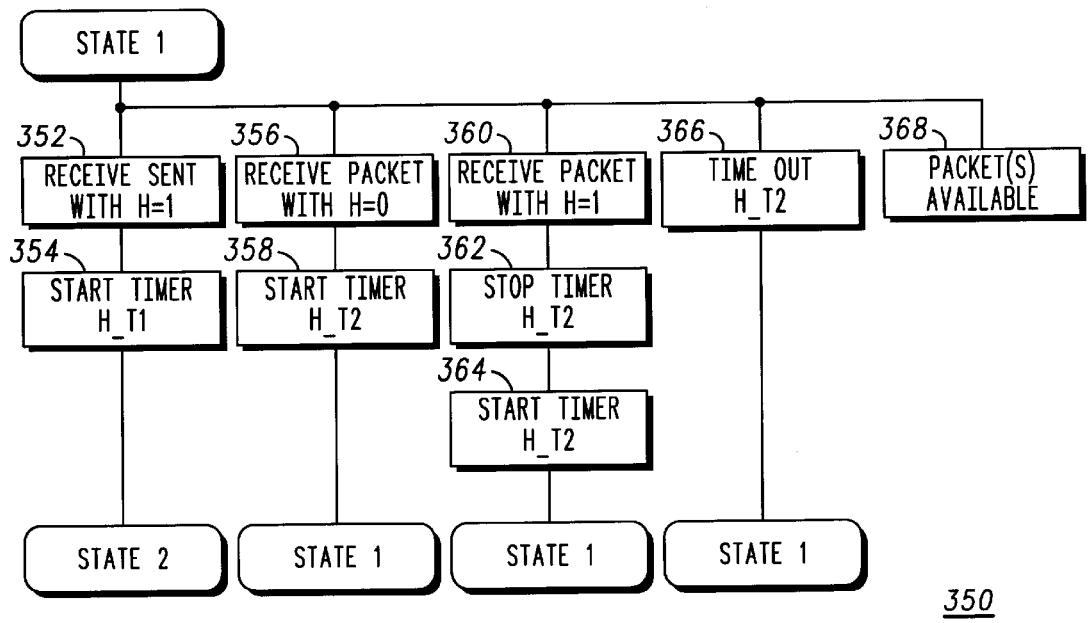
FIG. 15 is a system design chart illustrating system operation details while the state machine of FIG. 13 is in state one.

FIG. 15 is a system design chart illustrating operation of the full-duplex unit 270 while the state machine 320 is in state 1. In state 1, the full-duplex unit 270 assumes that the half-duplex unit 272 will shortly have permission to transmit packets over the channel. While in state 1, if the full-duplex unit 270 sends a packet to the half-duplex unit 272 with the H-bit=0 (step 352), the timeout timer T1 280 is started, defining a timeout period H_T1. The timeout period H_T1 defines the maximum amount of time that the full-duplex unit 270 will wait to receive an ACK from the half-duplex unit 272 in response to the transmitted packet. After starting the timer T1, the state machine 320 transitions to state 2.

If an uplink packet is received from the half-duplex unit 272 with the H-bit cleared (step 356), the full-duplex unit 270 stops the timeout timer T2 282 (step 358). After halting the timeout timer T2, the state machine 320 remains in state 1.

If an uplink packet is received from the half-duplex unit 272 with the H-bit set (step 360), the timeout timer T2 282 is stopped (step 362) and then restarted (step 364) to define a new timeout period H_T2. In this event, the state machine 320 remains in state 1.

If while in state 1 a timeout occurs with timer T2 282 (step 366), no action is taken and the state machine 320 remains in state 1. If while in state 1 a downlink packet becomes available at the full-duplex unit 270 for transmission to the half-duplex unit 272, it is queued in the transmit queue 276 and the Packet(s) Available signal is asserted by the LLC layer and saved for future use in state 0.

In the preferred embodiment, details of the operation of the half-duplex unit 272 in state 1 are similar to that of the full-duplex unit 270.

Figure 16:
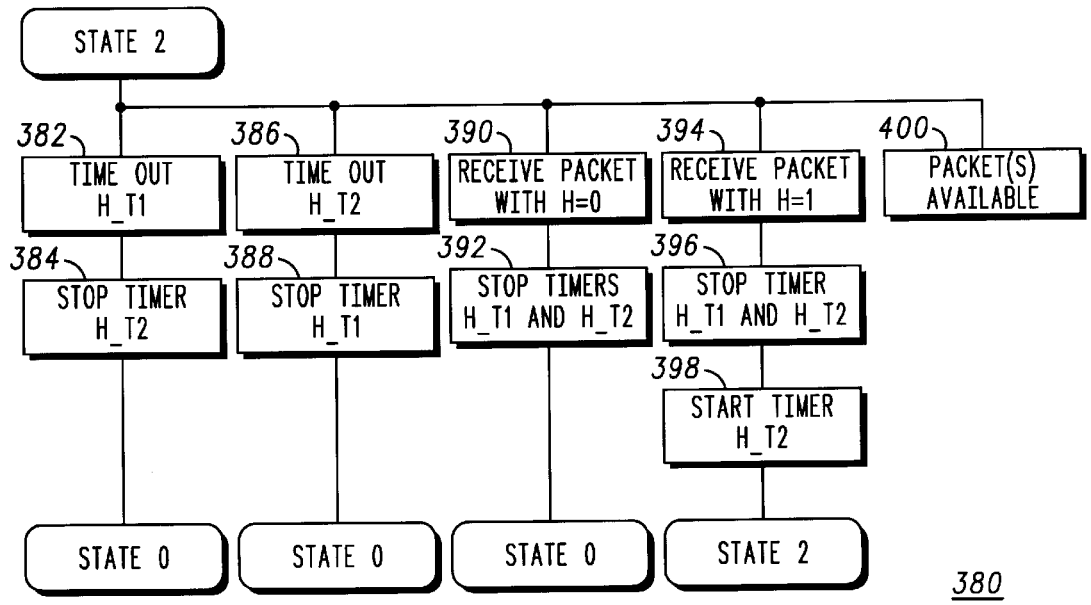
FIG. 16 is a system design chart illustrating system operation details while the state machine of FIG. 13 is in state two.

FIG. 16 is a system design chart 380 illustrating operation of the full-duplex unit 270 while the state machine 320 is in state 2. In state 2, the full-duplex unit 270 assumes that the half-duplex unit 272 is allowed to transmit over the channel.

In state 2, if the timeout period H_T1 expires (step 382), the timeout timer T2 282 is stopped (step 384). The state machine 320 then transitions to state 0.

While in state 2, if the timeout period H_T2 expires (step 386), the timeout timer T1 280 is stopped (step 388), and the state machine 320 transitions to state 0.

If an uplink packet is received with the H-bit cleared (step 390), the full-duplex unit 270 stops timeout timers 280, 282 (step 392), and the state machine 320 transitions to state 0.

If an uplink packet is received with the H-bit set (step 394), the timeout timers 280, 282 are stopped (step 396), and the timeout timer T2 is restarted (step 398) to define a new timeout period H_T2. The state machine 320 remains in state 2.

If while in state 2 a downlink packet becomes available at the full-duplex unit 270 for transmission to the half-duplex unit 272, it is queued in the transmit queue 276 and the Packet(s) Available signal is asserted by the LLC layer and saved for future use in state 0.

In the preferred embodiment, details of the operation of the half-duplex unit 272 in state 2 are similar to that of the full-duplex unit 270.

Figure 17:
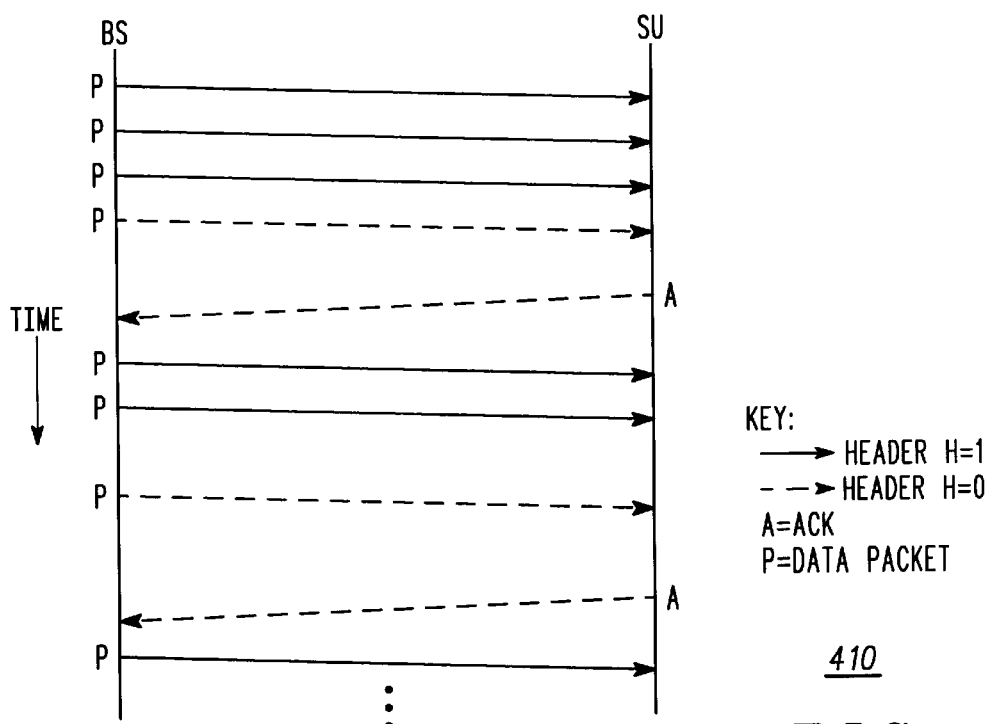
FIG. 17 is a Message Sequence Chart illustrating steady-state operation of the system shown in FIG. 12, which includes the state machine illustrated in FIG. 13.

FIG. 17 is a Message Sequence Chart 410 illustrating steady state operation of the system 271, which includes the state machine 320. The vertical line on the left represents the full-duplex unit 270 (e.g., a base station BS). The vertical line on the right represents the half-duplex unit 272 (e.g., a subscriber unit SU). The Message Sequence Chart 410 illustrates an example of error free, mainly downlink traffic on an unloaded channel between the full-duplex and half-duplex units 270, 272. The scenario begins with the full-duplex unit 270 transmitting a stream of packets to the half-duplex unit 272. The first three headers include H-bits that are set indicating that additional packets are following, and that the half-duplex unit 272 should refrain from any transmissions during this period.

The fourth header packet transmitted by the full-duplex unit 270 includes a header bit that is cleared, indicating that there are no further packets in the stream.

The half-duplex unit 272 responds to the cleared H-bit with an acknowledgment (ACK) having the header bit cleared, indicating that the half-duplex unit 272 is not transmitting packets immediately following the acknowledgement.

The full-duplex unit 270 then resumes transmission of a second stream of downlink packets, having two header packets with the H-bit set, followed by a third header having the H-bit cleared. After receiving the downlink packets corresponding to the cleared H-bit, the half-duplex unit 272 transmits a reservation request followed by an acknowledgement having the H-bit cleared.

The full-duplex unit 270 then resumes transmission of downlink traffic.

Figure 18:
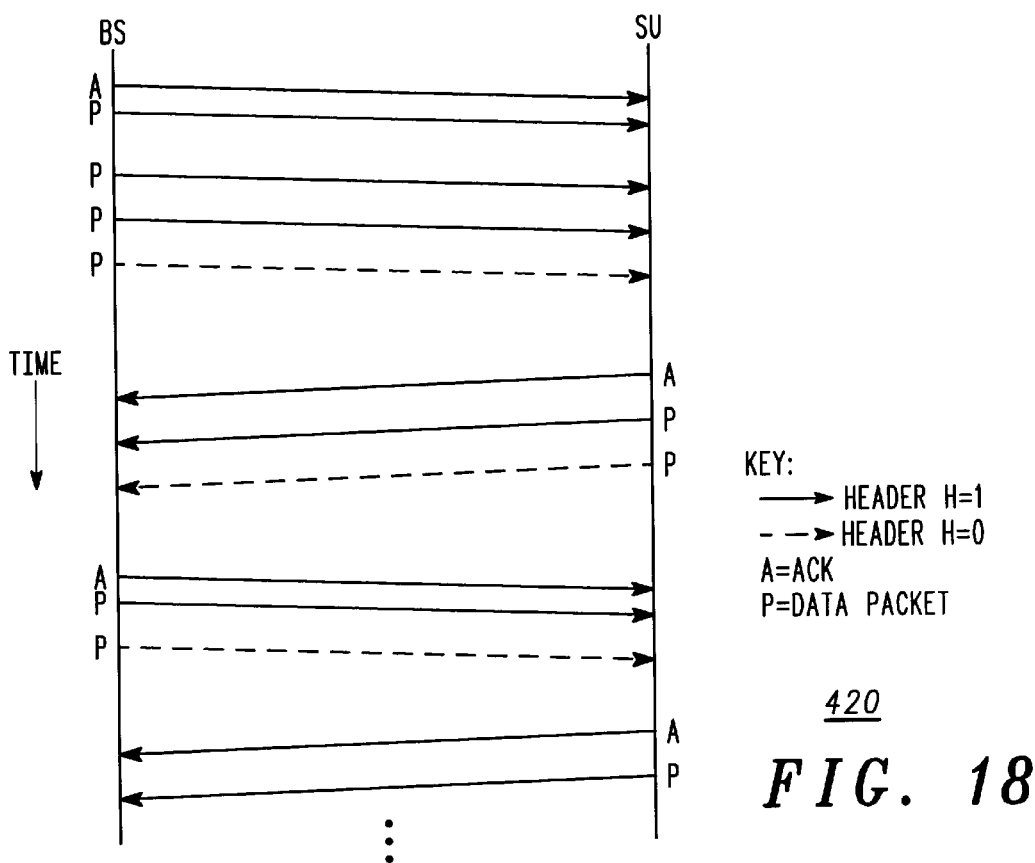
FIG. 18 is a Message Sequence Chart illustrating bi-directional operation of the system shown in FIG. 12, which includes the state machine at FIG. 13.

FIG. 18 is a Message Sequence Chart 420 illustrating bi-directional traffic between the full-duplex and half-duplex units 270–272, according to the state machine 320. In this scenario, the full-duplex unit 270 first transmits an acknowledgment having the H-bit set, indicating that additional downlink data packets will immediately follow the acknowledgment. The full-duplex unit 270 then transmits a packet stream having three header packets with their H-bit set. The fourth header packet is transmitted with the H-bit cleared, indicating that the packet stream has ended. Upon receiving a downlink packet with the H-bit clear, the half-duplex unit 272 transmits an acknowledgment having the H-bit set. The acknowledgment with the H-bit set indicates that further uplink packets are to be transmitted by the half-duplex unit 272 immediately following the acknowledgment. This causes the full-duplex unit 270 to hold off transmission of downlink packets until the half-duplex unit has completed. The half-duplex unit 272 transmits a packet header having the H-bit set, followed by a packet header having the H-bit cleared, indicating the end of the packet stream. Upon receiving the packet header having the H-bit cleared, the full-duplex unit 270 generates an acknowledge having the H-bit set followed by a packet header having the H-bit set and then a packet header having the H-bit cleared.

The half-duplex unit 272 then transmits an acknowledge and packet header, both having their H-bits set.

Figure 19:
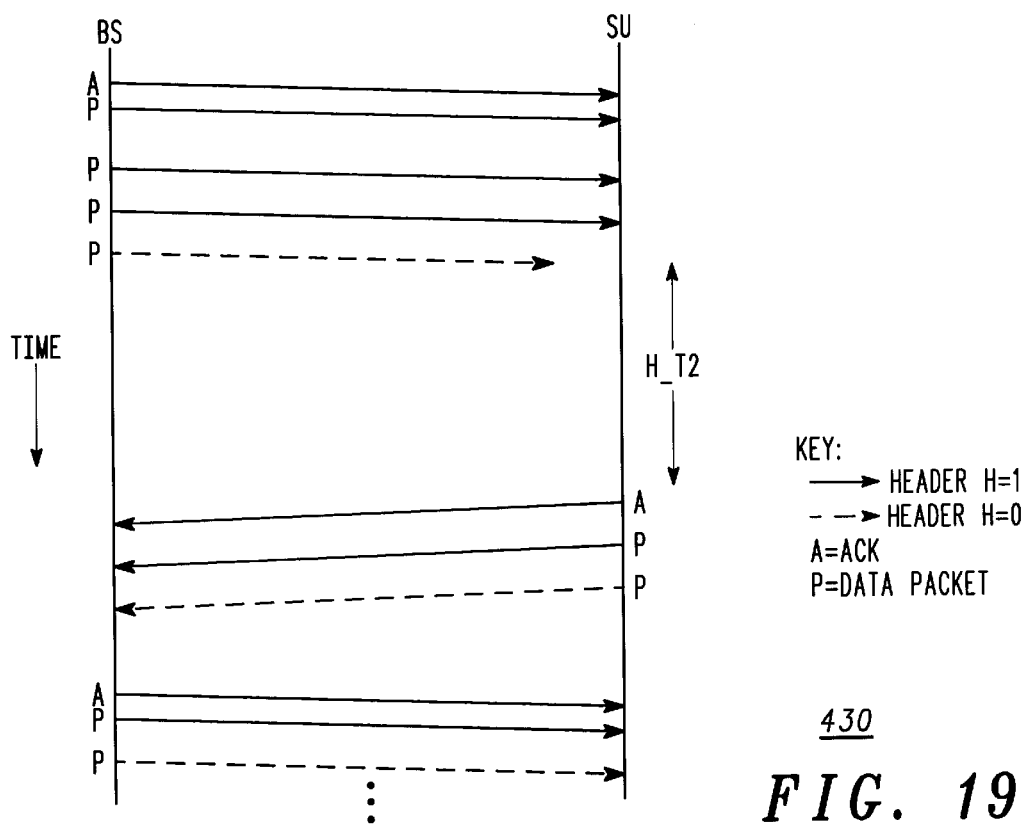
FIG. 19 illustrates an error recovery operation of the system of FIG. 12, which includes the state machine shown in FIG. 13.

FIG. 19 is a Message Sequence Chart 430 illustrating an error recovery operation of the system 271, which includes the state machine 320. In this scenario, downlink traffic is first transmitted by the full-duplex unit 270 to the half-duplex unit 272. The downlink packet header in the first data stream having the H-bit cleared is lost, and not received by the half-duplex unit 272. In the half-duplex unit 272, a timeout timer has started, defining the timeout period H_T2, upon receiving the packet immediately prior to the lost packet.

Upon expiration of the timeout period H_T2, the half-duplex unit 272 assumes control of the channel by transmitting an acknowledgment followed by a stream of uplink packets.

Figure 20:
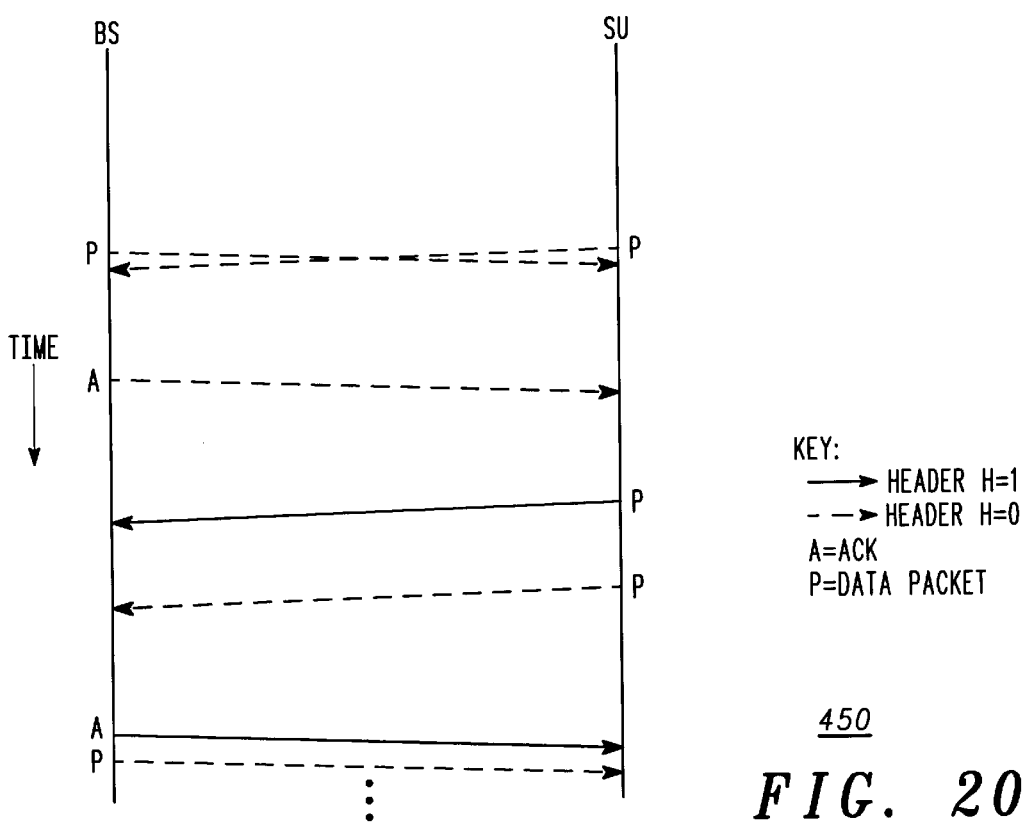
FIG. 20 is a Message Sequence Chart illustrating the operation of the system in FIG. 12 during a start-up collision.

FIG. 20 is a Message Sequence Chart 450 illustrating operation of the system 270 during a start-up collision, where the system 271 includes the state machine 320. In this scenario, the half-duplex unit 272 transmits a single packet having the header bit cleared. Concurrently, the full-duplex unit 270 transmits a data packet having its header bit cleared. The overlapping arrows between the full-duplex and half-duplex units indicate the collision.

In response to this situation, the full-duplex unit 270 detects the collision, and generates an acknowledgement having the H-bit cleared after receiving the uplink packet. The half-duplex unit 272 then generates a packet having the header bit set, and steady state operation is resumed. In this scenario, the full-duplex unit 270 does not attempt to retransmit the lost data packet.

In an alternate embodiment, the H-bit is only explicitly included in LLC layer packet formats which do not include a poll bit as is standard in LAP-D I-Frame formats. In these cases, the untransmitted H-bit is the logical inverse of the transmitted poll bit.

An alternate embodiment is to allow an acknowledgement with the H-bit cleared to indicate that either LLC peer is allowed to initiate a new transmission. An acknowledgement with the H-bit cleared does not start timer H_T1. An acknowledgement with the H-bit cleared does not delay transmission of any new I-Frames from either peer.

While specific embodiments of the present invention have been shown and described, it will apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. In a radio communication system, a method for preventing frame collisions on a channel linking a half-duplex unit and a full-duplex unit, the method comprising:

transmitting a first sequence of frames between the half-duplex unit and the full-duplex unit, each of the frames including a flag indicating whether the frame is the last frame of the sequence;

receiving at a receiving unit selected from the half-duplex and full-duplex units one of the frames having the flag set to indicate the last frame;

outputting from the receiving unit an acknowledgement in response to the set flag, the acknowledgement having a hold flag indicating whether the receiving unit is to subsequently transmit a second sequence of frames; and holding off further transmission of frames at a transmission unit selected from the half-duplex and full-duplex units in response to receiving the acknowledgement having the hold flag set to indicate the subsequent transmission of the second sequence of frames.

2. The method of claim 1, further comprising:
setting a timer upon the receipt of the acknowledgement at the transmission unit.

3. A radio communication system, comprising:
a half-duplex unit; and
a full-duplex unit in communication with the half-duplex unit;
wherein sequences of frames are transferred between the half-duplex unit and the full-duplex unit, each of the frames including a flag indicating whether the frame is the last frame of one of the sequences;
wherein upon receiving one of the frames having the flag set to indicate the last frame, a receiving unit selected from the half-duplex and full-duplex units generates an acknowledge frame having a hold flag indicating whether the receiving unit is to subsequently transmit a sequence of frames.

4. The radio communication system of claim 3, wherein the half-duplex unit is a mobile subscriber unit.

5. The radio communication system of claim 3, wherein the full-duplex unit is a base station.

6. The radio communication system of claim 3, further comprising:
a transmitting unit, selected from the half-duplex and full-duplex units, configured to hold off transmission of at least one of the sequence of frames in response to receiving the acknowledge frame having the hold flag set to indicate the subsequent transmission of a sequence of frames.

7. The radio communication system of claim 6, wherein the transmitting unit includes a timer that is settable upon the receipt of the hold flag.

8. In a communication system, a method of transferring packets over a communication channel linking a half-duplex unit and a full-duplex unit, the method comprising:
at the half-duplex unit, setting a flag included in a packet to indicate that one or more packets are to be transferred following the packet;
transferring the packet from the from half-duplex unit to the full-duplex unit;
storing in a hold address table at the full-duplex unit an identifier corresponding to the half-duplex unit in response to receiving the packet; and
refraining from transmitting packets from the full-duplex unit to the half-duplex unit while the identifier is stored in the hold address table.

9. The method of claim 8, further comprising:
queuing one or more packets at the half-duplex unit; and
setting the flag based on whether there is a queued packet.

10. The method of claim 8, further comprising:
starting a timeout timer included in the full-duplex unit in response to receiving the packet.

11. The method of claim 10, further comprising:
removing the identifier from the hold address table in response to expiration of a timeout period indicated by the timeout timer.

12. The method of claim 8, further comprising:
removing the identifier from the hold address table in response to the full-duplex unit receiving a packet having the flag not set.

13. A communication system, comprising:
a half-duplex unit configured to set a flag included in a packet to indicate that one or more packets are to be transferred following the packet, the half-duplex unit transferring the packet over a communication channel; and
a full-duplex unit for receiving the packet on the communication channel, the full-duplex unit storing in a hold address table an identifier corresponding to the half-duplex unit in response to receiving the packet, the full-duplex unit not transmitting packets to the half-duplex unit while the identifier is present in the hold address table.

14. The communication system of claim 13, wherein the half-duplex unit includes:
a queue for storing one or more packets; and
means for setting the flag based on whether there is a packet in the queue.

15. The communication system of claim 13, wherein the full-duplex unit includes a timeout timer responsive to received packets.

16. The communication system of claim 15, wherein the full-duplex unit includes:
means for removing the identifier from the hold address table in response to expiration of a timeout period indicated by the timeout timer.

17. The communication system of claim 13, wherein the full-duplex unit includes means for removing the identifier from the hold address table in response to the full-duplex unit receiving a packet having the flag not set.

18. The communication system of claim 13, wherein the communication channel is a radio frequency (RF) channel.

19. The communication system of claim 13, wherein the full-duplex unit includes means for detecting a collision on the communication channel.

20. In a radio communication system, a method for preventing frame collisions on a channel linking a half-duplex unit and a full-duplex unit, the method comprising:
transmitting a first sequence of frames between the half-duplex unit and the full-duplex unit, each of the frames including a flag indicating whether the frame is the last frame of the sequence;
receiving at a receiving unit selected from the half-duplex and full-duplex units the first sequence of frames; and
holding off transmission of a second sequence of frames from the receiving unit until receiving one of the frames in the first sequence having the flag set.

* * * * *